United States Patent
Weiss

(10) Patent No.: US 6,769,313 B2
(45) Date of Patent: Aug. 3, 2004

(54) FLEXIBLE TACTILE SENSOR

(75) Inventor: Roger E. Weiss, Foxboro, MA (US)

(73) Assignee: Paricon Technologies Corporation, Fall River, MA (US)

( * ) Notice: Subject to any disclaimer, the term of this patent is extended or adjusted under 35 U.S.C. 154(b) by 0 days.

(21) Appl. No.: 10/235,272

(22) Filed: Sep. 5, 2002

(65) Prior Publication Data

US 2003/0051561 A1 Mar. 20, 2003

Related U.S. Application Data

(60) Provisional application No. 60/322,363, filed on Sep. 14, 2001.

(51) Int. Cl.[7] ................................................. G01D 7/00
(52) U.S. Cl. ............................................... 73/862.046
(58) Field of Search ..................... 73/862.041, 862.042, 73/862.043, 862.044, 862.045, 862.046, 862.391, 862.471

(56) References Cited

U.S. PATENT DOCUMENTS

| | | | | |
|---|---|---|---|---|
| 4,555,954 A | * | 12/1985 | Kim | 73/862.046 |
| 5,033,291 A | * | 7/1991 | Podoloff et al. | 73/172 |
| 5,055,838 A | * | 10/1991 | Wise et al. | 340/870.37 |
| 6,073,497 A | * | 6/2000 | Jiang et al. | 73/862.68 |
| 6,216,545 B1 | * | 4/2001 | Taylor | 73/862.046 |
| 6,452,479 B1 | * | 9/2002 | Sandbach | 338/208 |

* cited by examiner

*Primary Examiner*—Max Noori
(74) *Attorney, Agent, or Firm*—Brian M. Dingman, Esq.; Mirick, O'Connell, DeMallie & Lougee LLP

(57) ABSTRACT

A flexible tactile sensor, comprising a flexible distributed array of force sensors that generate electric signals in response to an applied load, a flexible, electrically-insulating matrix having outer faces, one face against the array of force sensors, and a plurality of spaced electrically conductive pathways through the matrix between its faces, with insulating matrix material between the pathways, to carry the electric signals generated by the force sensors to the other face of the matrix.

21 Claims, 1 Drawing Sheet

FLEXIBLE TACTILE SENSOR

CROSS-REFERENCE TO RELATED APPLICATION

This application claims priority of provisional application serial No. 60/322,363 filed on Sep. 14, 2001.

FIELD OF THE INVENTION

This invention relates to a flexible tactile sensor and tactile sensors for use on the human body.

BACKGROUND OF THE INVENTION

Anisotropic Conductive Elastomer (ACE) is a composite of conductive metal elements in an elastomeric matrix that is normally constructed such that it conducts along one axis only. In general, ACE is made to conduct through its thickness. One form of ACE material is made by mixing magnetic particles with a liquid resin, forming the mix into a continuous sheet, and curing the sheet in the presence of a magnetic field. This results in the particles forming a large number of closely spaced columns through the sheet thickness. The columns are electrically conductive. The resulting structure has the unique property of being both flexible and anisotropically conductive. These properties provide for an enabling interconnection medium which, when combined with other technologies, make it possible to realize new interconnect capabilities.

ACE material can be married with flexible circuits to provide more dynamic range to an ACE interconnect. The flexible circuit consists of an electrically-insulating material such as polyimide, with opposing conductive pads on the surfaces. The pads are vertically interconnected by plated-through holes. Mounting such a flex circuit to ACE material provides more vertical compliance to the ACE material. This allows the ACE material to be used in assemblies that are not flat, such as circuit boards with solder mask, in which the circuit board pads are lower than the top of the solder mask, thus creating a small well around each pad and into which the ACE material-based interconnect must protrude in order to make electrical contact with the pads.

The nerves of the human body provide feedback from the skin to the brain. The majority of the information transmitted through the skin is touch or pressure based information. There are many situations in which this human nerve feedback is impaired or insufficient for a given situation, which can affect a person's abilities in particular situations. The brain receives signals from nerves that are critical to human motor skills, such as movement of the extremities in such basic requirements as walking, and in sensing objects by touch, most commonly with the hands. When this nerve function is impaired or lost, the person's functionality is impaired or lost. For example, the nerves of the human foot continuously provide feedback information to assist in balance and the ability to walk. As the load on the foot is transferred from heel to toe, signals are automatically fed back to the brain for processing and instruction. When a component of the foot such as a toe is lost or impaired, the feedback information provided is lost or reduced, and the ability to walk can be greatly impaired.

There are also situations in which it is desirable to accomplish effective touch sensing or force feedback in other mechanical objects. One parallel application to that described above would be in prosthetics, such as artificial feet, arms or hands. Proper control of prosthetics requires touch sensing and feedback based thereon in order to mimic the body's unimpaired natural functionality.

Still other applications relate to machines. An example is robot arms in which tactile sensing can greatly aid functionality and usefulness.

In all these situations, in order to accomplish tactile sensing it is necessary to have one, or preferably a plurality, of force sensors that are wired to a signal receptor in many applications. Such tactile sensors should be flexible, compact and unobtrusive.

SUMMARY OF THE INVENTION

This invention features an electrical interconnect circuit device comprising an anisotropic conductive elastomer (ACE) material defining two opposing faces and a series of conductive columns extending between the faces. The invention may also use a flexible circuit element defining two opposing faces. One face of the flexible circuit element is in electrical contact with one face of the ACE. The faces of the flexible circuit element may carry one or more electrically-conductive pads. The flexible circuit element further defines a series of conductive pathways extending between its faces. The ACE material and flexible circuit element together provide an interconnect with low inductance.

The ACE material may comprise conductive particles embedded in an elastomer, the conductive particles defining the conductive columns. The flexible circuit element conductive pathways may comprise conductor-lined openings extending between the opposing faces of the flexible circuit element. The flexible circuit element may further define conductive pads on both faces of the flexible circuit element and in electrical contact with a conductive pathway, to provide electrical contact areas on the flexible circuit element, one contact area for interfacing with the ACE material, and the other contact area for interfacing with another electrical device.

It is an object of this invention to provide a flexible tactile sensor.

It is a further object of this invention to provide such a sensor that can be used as a skin-substitute in terms of the skin's touch and force sense capabilities.

It is a further object of this invention to provide such a flexible tactile sensor that can be inserted in a shoe to provide motion feedback information that can be used to assist in balance and the ability to walk.

It is a further object of this invention to provide such a flexible tactile sensor that can be used as the skin of an artificial hand, be it a prosthetic device or a robotic device.

The present invention combines ACE with an array of pressure sensors to generate electrical signals as a function of a distributed load. This combination of ACE and pressure sensors can provide the core of what could be called "smart skin". This resulting material can serve as the sensor feedback element in prosthetics, remote "hands", training equipment and numerous other applications.

The subject invention combines ACE with a flexible array of piezoelectric sensors that put out an electrical signal in proportion to the applied force. The ACE provides an interconnection medium between the sensors and an information collecting source. This combination can be implemented in several ways to obtain the desired function. The following includes examples of the invention. Other examples will become obvious to others after learning from this teaching.

One focus of this invention is to describe an electronic inner sole which will create a set of electrical signals in response to the load transfer of the foot as it moves the load from heel to toe.

This invention results from the realization that a flexible tactile sensor can be accomplished by marrying a layer of anisotropic conductive elastomer to a flexible force sensor comprising a distributed array of individual force sensing elements. The ACE accomplishes a flexible electrical interface from the force sensors to an appropriate electrical connector, and along to an electrical device designed to use the generated force signals.

More specifically, this invention features a flexible tactile sensor, comprising a flexible distributed array of force sensors that generate electric signals in response to an applied load, a flexible, electrically-insulating matrix having outer faces, one face against the array of force sensors, and a plurality of spaced electrically conductive pathways through the matrix between its faces, with insulating matrix material between the pathways, to carry the electric signals generated by the force sensors to the other face of the matrix.

The force sensors may comprise piezoelectric elements. The force sensors may be embedded in an elastomeric matrix. The flexible distributed array of force sensors may comprise a 1–3 piezo composite. The conductive pathways may comprise conducting particles.

The flexible tactile sensor may further comprising a flexible circuit element against the other face of the matrix. The flexible circuit element may define a plurality of separate conductive pathways. The flexible circuit element may comprise a plurality of electric contact pads on at least the surface that is against the matrix. The flexible tactile sensor may further comprise a protective flexible layer on the side of the flexible circuit element that is not against the other face of the matrix.

The flexible tactile sensor may further comprise electric circuit elements disposed on the other face of the matrix and in electrical contact with conductive pathways through the matrix. The flexible tactile sensor may further comprise an electrical connector that conducts electric signals generated by the force sensors and passed through the conductive pathways of the matrix. In this case, the flexible tactile sensor may still further comprise an electrical device that receives the signals conducted by the connector. The electrical device may comprise a microprocessor. The flexible tactile sensor may further comprise a wireless transmitter and transmitter power source, the transmitter operatively connected to the electrical connector, for remotely transmitting electric signals generated by the force sensors.

The invention may comprise an electronic tactile sensing shoe sole comprising the flexible tactile sensor described above sized and shaped to fit in a shoe. The invention may also comprise an electronic tactile sensing glove for an artificial hand comprising the flexible tactile sensor described above, at an external portion of an artificial hand. In this case, the flexible tactile sensor may further include an external elastomeric artificial skin layer covering and environmentally sealing the array of force sensors.

In a more specific embodiment, the invention features a flexible tactile sensor, comprising a flexible distributed array of force sensors that generate electric signals in response to an applied load, in which the flexible distributed array of force sensors comprises a 1–3 piezo composite wherein the force sensors comprise piezoelectric elements embedded in an elastomeric matrix, a flexible, electrically-insulating matrix having outer faces, one face against the array of force sensors, a plurality of spaced electrically conductive pathways through the matrix between its faces, with insulating matrix material between the pathways, to carry the electric signals generated by the force sensors to the other face of the matrix in which the conductive pathways comprise conducting particles, a flexible circuit element against the other face of the matrix, in which the flexible circuit element defines a plurality of separate conductive pathways and wherein the flexible circuit element comprises a plurality of electric contact pads on at least the surface that is against the matrix, and a protective flexible layer on the side of the flexible circuit element that is not against the other face of the matrix.

Also featured is an electronic tactile sensing shoe sole, comprising a flexible distributed array of force sensors that generate electric signals in response to an applied load, in which the flexible distributed array of force sensors comprises a 1–3 piezo composite wherein the force sensors comprise piezoelectric elements embedded in an elastomeric matrix, a flexible, electrically-insulating matrix having outer faces, one face against the array of force sensors, a plurality of spaced electrically conductive pathways through the matrix between its faces, with insulating matrix material between the pathways, to carry the electric signals generated by the force sensors to the other face of the matrix in which the conductive pathways comprise conducting particles, and a flexible circuit element against the other face of the matrix, wherein the flexible tactile sensor is sized and shaped to fit in a shoe.

BRIEF DESCRIPTION OF THE DRAWINGS

Other objects, features and advantages will occur to those skilled in the art from the following description of the preferred embodiments, and the accompanying drawings, in which.

DETAILED DESCRIPTION OF THE PREFERRED EMBODIMENTS

Figure 1:
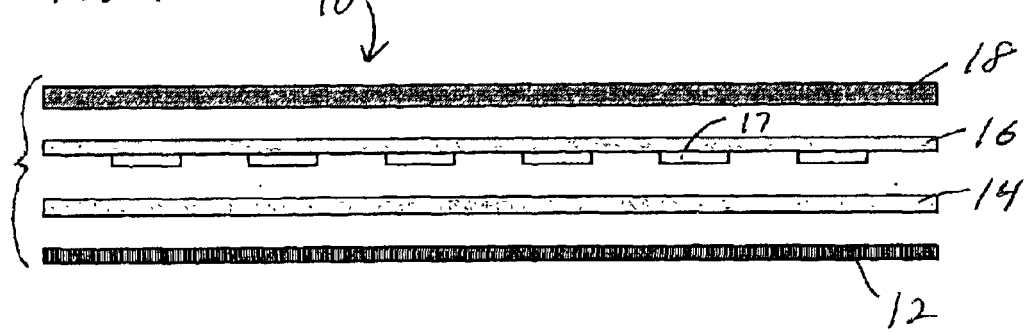
FIG. 1 is an exploded schematic view of a preferred embodiment of a flexible tactile sensor of this invention arranged to be used as a shoe inner sole.

FIG. 1 schematically depicts an electronic inner sole 10 which can be inserted or built into a conventional shoe, or the foot of an artificial leg. The electronic inner sole consists of the following components. A distributed array of piezoelectric (or other) force sensors mounted in an elastomeric matrix 12. An example of an array of sensors that could be used in thus application are 1–3 piezo composites such as those made by Material Systems, Inc. of Littleton, Mass. The 1–3 piezo composite is an array of piezo ceramic rods in a polymer matrix. The piezo ceramic rods are typically injection molded piezo ceramic materials rods that are embedded in a polymer matrix such that the rods extend between the faces of the matrix. The material is flexible and exhibits inherent directionality, high coupling and a broad bandwidth. Each sensor in the array generates an electric voltage in response to an applied load placed on it. A layer of ACE 14 placed over the sensor array provides a flexible electrical interconnection to the elements of the array.

There is optionally included flex circuit 16. Electrical contact pads 17 may be provided on one or both faces of flex circuit 16 to provide contact in desired areas of ACE 14 and thus to desired areas of force sensing matrix 12. In an alternative embodiment, the electrical paths provided by the flex circuit could be directly formed on the ACE, for example by electroplating of conductive elements and traces. An additional layer of flexible protective material 18 may be placed over flex circuit 16 to serve as a protective and wear member.

Figure 2:
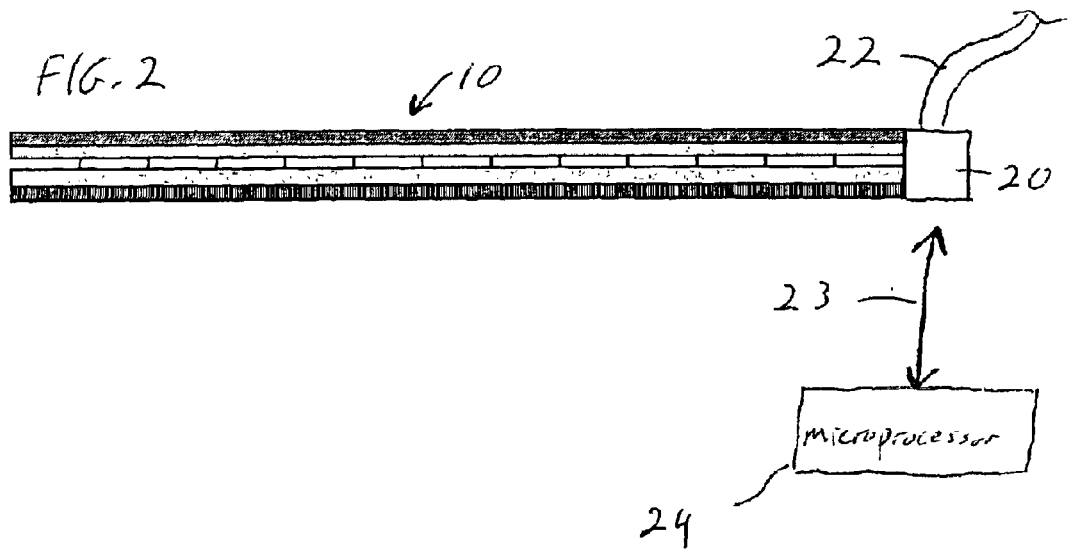
FIG. 2 is a view of the assembled sensor of FIG. 1, also depicting additional electrical connectivity and use devices for different embodiments of this invention.

FIG. 2 depicts assembly 10 and its signal output means such as electrical connector 20 that in this embodiment would be connected to flex 16. The signals generated by the force sensors would be passed to a desired electrical device either by electrical cable 22 or by wireless connection depicted by arrow 23. In embodiments in which signal processing must be accomplished for the desired application, microprocessor 24 may be included.

The tactile sensor of the invention may be located in a shoe, preferably as part of or in place of the inner sole. In this case, there may be a device located in the shoe serving as a wireless transmitter along with a battery power source (which may be part of connector 20), or cable 22 may go up the leg of the artificial limb.

It is also possible to incorporate local or distributed feedback by incorporating one or more microprocessors 24 with specific control functions that are accessible to the flexible tactile sensor. In an artificial limb or mechanical device such as a robot arm, this functionality may be provided in close proximity or connected directly to the flexible tactile sensor. Typically, at least a short flexible cable connecting the sensor to the use electronics would be used, so that movements of the tactile sensor would not be coupled to the electronics.

Each force sensor, or group of force sensors, generates its own signals as the sensors are subjected to varying loads. These signals are interconnected through the ACE and flex circuit to the receiving sub-system or system. These signals can be used to provide the required information and control functions. In the case of the artificial foot, the signals can provide the means to balance the body during walking and running.

In another application, the electronic sole of the invention could be mounted in an athletic shoe to provide signals in response to the load distribution during physical activity. This could be useful in numerous applications, including to optimize dynamic fit or, with feedback in a sneaker or other athletic shoe, to provide dynamic feedback for training.

Another application of the invention is in forming the skin of an artificial hand. In this application, the materials are cast/formed as a series of over-layered gloves. The innermost layer could be a conformal layer of circuitry to interconnect the force sensor output signals to local or remote processors. The next layer would be a glove made in the ACE format. The third layer would be a glove populated with piezoelectric transducers. The fourth layer would be an outer elastomeric skin serving as a wear member and environmental seal. This would operate in much the same way as the shoe inner sole described above. The outer layer is flexible and tough, and typically a plastic. Kapton can be used, as could elastomers.

The conductive pathways in the ACE can be accomplished in a number of manners. In many cases, these will be accomplished with aligned magnetic conducting particles formed as described above. Alternatively, the conductors could be accomplished with magnetically aligned wire segments or other conductive bodies.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A flexible tactile sensor, comprising:
   a flexible distributed array of force sensors that generate electric signals in response to an applied load;
   a flexible, electrically-insulating matrix having outer faces, one face against the array of force sensors; and
   a plurality of spaced electrically conductive pathways through the matrix between its faces, with insulating matrix material between the pathways, to carry the electric signals generated by the force sensors to the other face of the matrix.

2. The flexible tactile sensor of claim 1 in which the force sensors comprise piezoelectric elements.

3. The flexible tactile sensor of claim 1 in which the force sensors are embedded in an elastomeric matrix.

4. The flexible tactile sensor of claim 3 in which the flexible distributed array of force sensors comprises a 1–3 piezo composite.

5. The flexible tactile sensor of claim 1 in which the insulating matrix comprises an anisotropic conductive elastomer wherein said conductive pathways define columns of conducting particles.

6. The flexible tactile sensor of claim 1 further comprising a flexible circuit element against the other face of the matrix.

7. The flexible tactile sensor of claim 6 wherein the flexible circuit element defines a plurality of separate conductive pathways.

8. The flexible tactile sensor of claim 7 wherein the flexible circuit element comprises a plurality of electric contact pads on at least the surface that is against the matrix.

9. The flexible tactile sensor of claim 6 further comprising a protective flexible layer on the side of the flexible circuit element that is not against the other face of the matrix.

10. The flexible tactile sensor of claim 1 further comprising electric circuit elements disposed on the other face of the matrix and in electrical contact with conductive pathways through the matrix.

11. The flexible tactile sensor of claim 1 further comprising an electrical connector that conducts electric signals generated by the force sensors and passed through the conductive pathways of the matrix.

12. The flexible tactile sensor of claim 11 further comprising an electrical device that receives the signals conducted by the connector.

13. The flexible tactile sensor of claim 12 in which the electrical device comprises a microprocessor.

14. The flexible tactile sensor of claim 11 further comprising a wireless transmitter and transmitter power source, the transmitter operatively connected to the electrical connector, for remotely transmitting electric signals generated by the force sensors.

15. An electronic tactile sensing shoe sole comprising the flexible tactile sensor of claim 6 sized and shaped to fit in a shoe.

16. An electronic tactile sensing glove for an artificial hand comprising the flexible tactile sensor of claim 6 at an external portion of an artificial hand.

17. The flexible tactile sensor of claim 16 further comprising an external elastomeric artificial skin layer covering and environmentally sealing the array of force sensors.

18. A flexible tactile sensor, comprising:
   a flexible distributed array of force sensors that generate electric signals in response to an applied load, in which the flexible distributed array of force sensors comprises a 1–3 piezo composite wherein the force sensors comprise piezoelectric elements embedded in an elastomeric matrix;

a flexible, electrically-insulating matrix having outer faces, one face against the array of force sensors;

a plurality of spaced electrically conductive pathways through the matrix between its faces, with insulating matrix material between the pathways, to carry the electric signals generated by the force sensors to the other face of the matrix in which the conductive pathways comprise conducting particles;

a flexible circuit element against the other face of the matrix, in which the flexible circuit element defines a plurality of separate conductive pathways and wherein the flexible circuit element comprises a plurality of electric contact pads on at least the surface that is against the matrix; and a protective flexible layer on the side of the flexible circuit element that is not against the other face of the matrix.

19. An electronic tactile sensing shoe sole, comprising:

a flexible distributed array of force sensors that generate electric signals in response to an applied load, in which the flexible distributed array of force sensors comprises a 1–3 piezo composite wherein the force sensors comprise piezoelectric elements embedded in an elastomeric matrix;

a flexible, electrically-insulating matrix having outer faces, one face against the array of force sensors;

a plurality of spaced electrically conductive pathways through the matrix between its faces, with insulating matrix material between the pathways, to carry the electric signals generated by the force sensors to the other face of the matrix in which the conductive pathways comprise conducting particles; and a flexible circuit element against the other face of the matrix;

wherein the flexible tactile sensor is sized and shaped to fit in a shoe.

20. The flexible tactile sensor of claim 18, wherein said insulating matrix comprises an anisotropic conductive elastomer wherein said conductive pathways define columns of conducting particles.

21. The shoe sole of claim 19, wherein said insulating matrix comprises an anisotropic conductive elastomer wherein said conductive pathways define columns of conducting particles.

* * * * *